United States Patent [19]
Lordi et al.

[11] Patent Number: 5,857,204
[45] Date of Patent: Jan. 5, 1999

[54] RESTORING THE STATE OF A SET OF FILES

[75] Inventors: Robert D. Lordi, Wayland; Clifford A. Lasser, Cambridge; Craig W. Stanfill, Waltham, all of Mass.

[73] Assignee: Ab Initio Software Corporation, Concord, Mass.

[21] Appl. No.: 678,398

[22] Filed: Jul. 2, 1996

[51] Int. Cl.⁶ .................................................. G06F 17/30
[52] U.S. Cl. ..................................... 707/202; 395/182.17
[58] Field of Search ..................................... 395/613, 618, 395/182.13, 182.14, 182.17, 500, 527; 707/102, 202

[56] References Cited

U.S. PATENT DOCUMENTS

| | | | |
|---|---|---|---|
| 4,791,556 | 12/1988 | Vilkaitis | 395/348 |
| 5,201,044 | 4/1993 | Frey, Jr. et al. | 395/182.18 |
| 5,455,944 | 10/1995 | Haderle et al. | 395/618 |
| 5,471,615 | 11/1995 | Amatsu et al. | 395/200.32 |
| 5,504,883 | 4/1996 | Coverston et al. | 395/618 |
| 5,504,899 | 4/1996 | Raz | 395/610 |
| 5,522,066 | 5/1996 | Lu | 395/601 |
| 5,530,848 | 6/1996 | Gilbert et al. | 395/683 |
| 5,586,312 | 12/1996 | Johnson et al. | 395/610 |
| 5,594,900 | 1/1997 | Cohn et al. | 395/618 |
| 5,613,060 | 3/1997 | Britton et al. | 395/182.13 |

OTHER PUBLICATIONS

IBM, Database 2 AIX/6000 Programming Reference manual, 1993, pp. 282–283.

Apers, Peter M.G., et al., "PRISMA/DB: A Parallel, Main Memory Relational DBMS", Dec. 1992, IEEE Transactions on Knowledge and Data Engineering, vol. 4, No. 6, pp. 541–554.

Boral, Haran, et al., "Prototyping Bubba, A Highly Parallel Database System", Mar. 1990, IEEE Transactions on Knowledge and Data Engineering, vol. 2, No. 1, pp. 4–23.

DeWitt, David J., et al., "The Gamma Database Machine Project", Mar. 1990, IEEE Transactions on Knowledge and Data Engineering, vol. 2, No. 1., pp. 44–62.

Frieder, Ophir and Chaitanya K. Baru, "Site and Query Scheduling Policies in Multicomputer Database Systems", Aug. 1994, IEEE Transactions on Knowledge and Data Engineering, vol. 6, No. 4, pp. 609–619.

Graefe, Goetz, "Volcano—An Extensible and Parallel Query Evaluation System", Feb. 1994, IEEE Transactions on Knowledge and Data Engineering, vol. 6, No. 1, pp. 120–135.

Graefe, Goetz and Diane L. Davison, "Encapsulation of Parallelism and Architecture–Independence in Extensible Database Query Execution", Aug. 1993, IEEE Transactions on Software Engineering, vol. 19, No. 8, pp. 749–764.

*Primary Examiner*—Maria N. Von Buhr
*Attorney, Agent, or Firm*—Fish & Richardson P.C.

[57] ABSTRACT

A method and system that applies transaction techniques to file system operations in non-database applications executing on parallel processing systems. For each of a set of file operations, methods embodied in program routines are defined for performing, finalizing, and undoing the operations, so that the operations may be used in a non-database application to create a transaction processing environment. In general, in one aspect, the invention provides a computer program library for adding the semantics of transactions to a set of native operations of a native file system. The library comprises a set of one or more families of routines, each such family of routines corresponding to at least one native operation, each such family of routines including: (a) a Perform routine including instructions for providing the functional equivalent of one of the family's corresponding native operations while preserving information necessary to roll back such native operations; (b) a Finalize routine including instructions for committing the result of the corresponding perform routine; and (c) an Undo routine including instructions for rolling back the result of the corresponding perform routine. Provision is also made for accomodating programs that cannot be modified to incorporate the Perform operation.

14 Claims, 15 Drawing Sheets

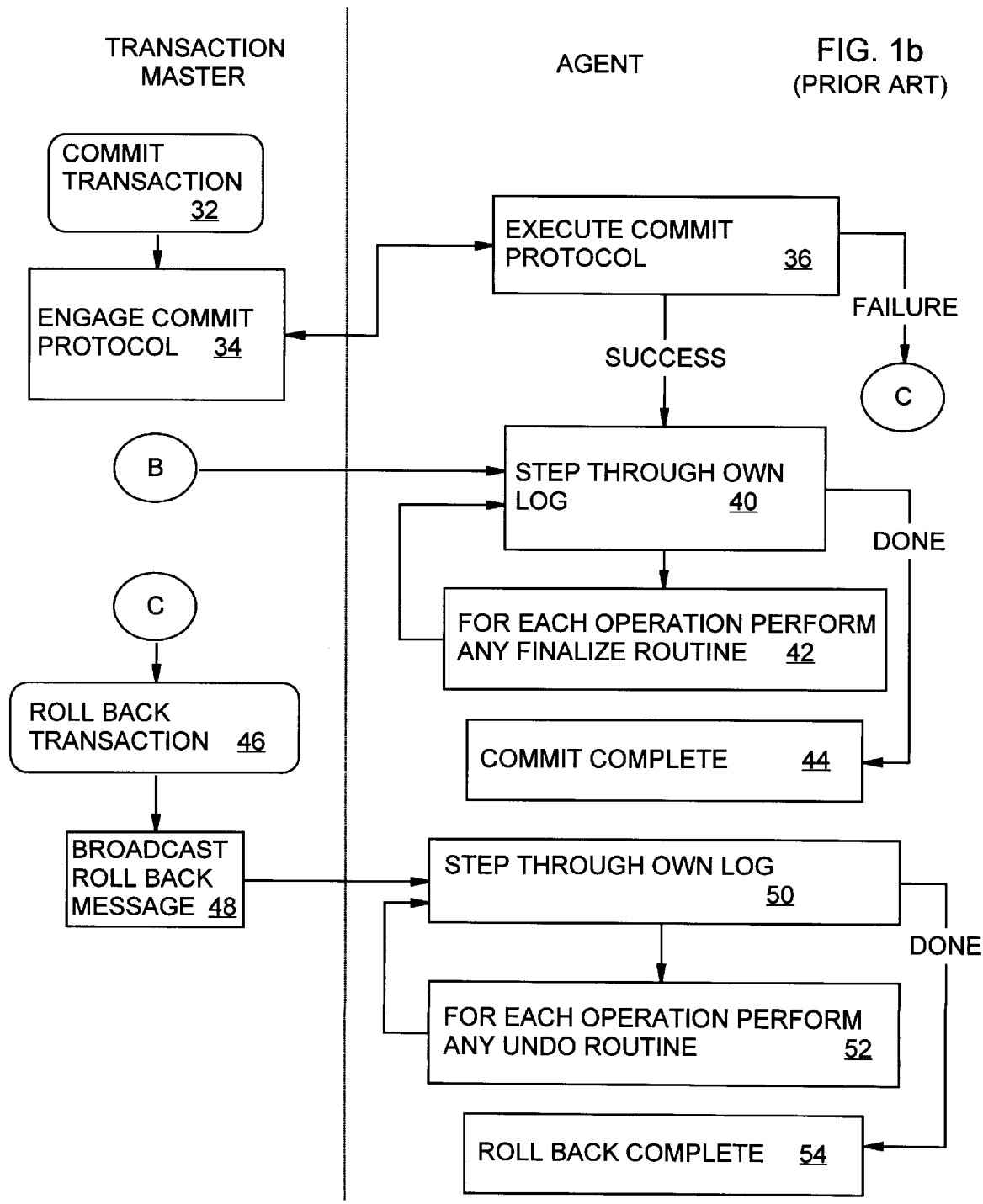

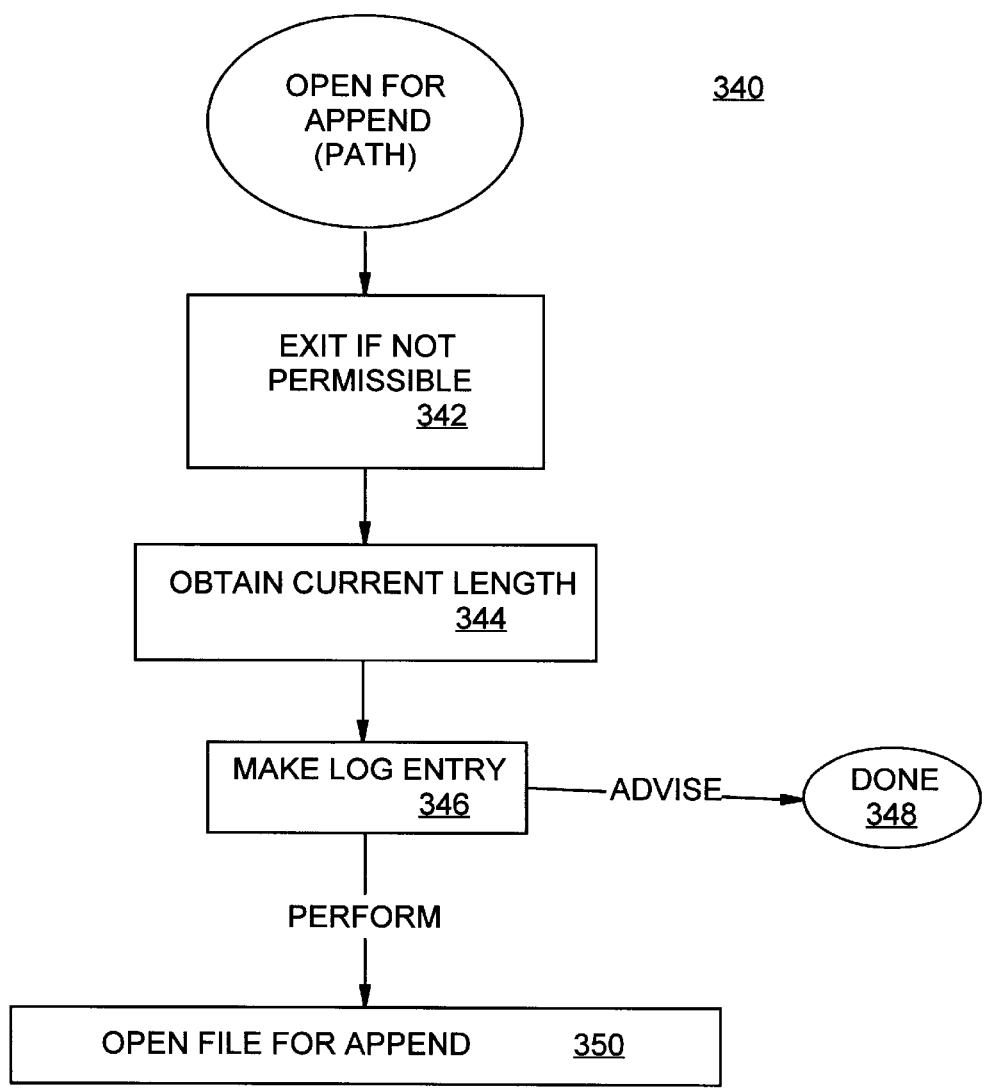
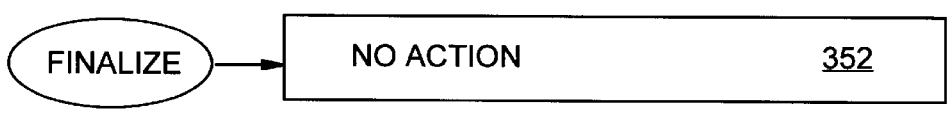
FIG. 7

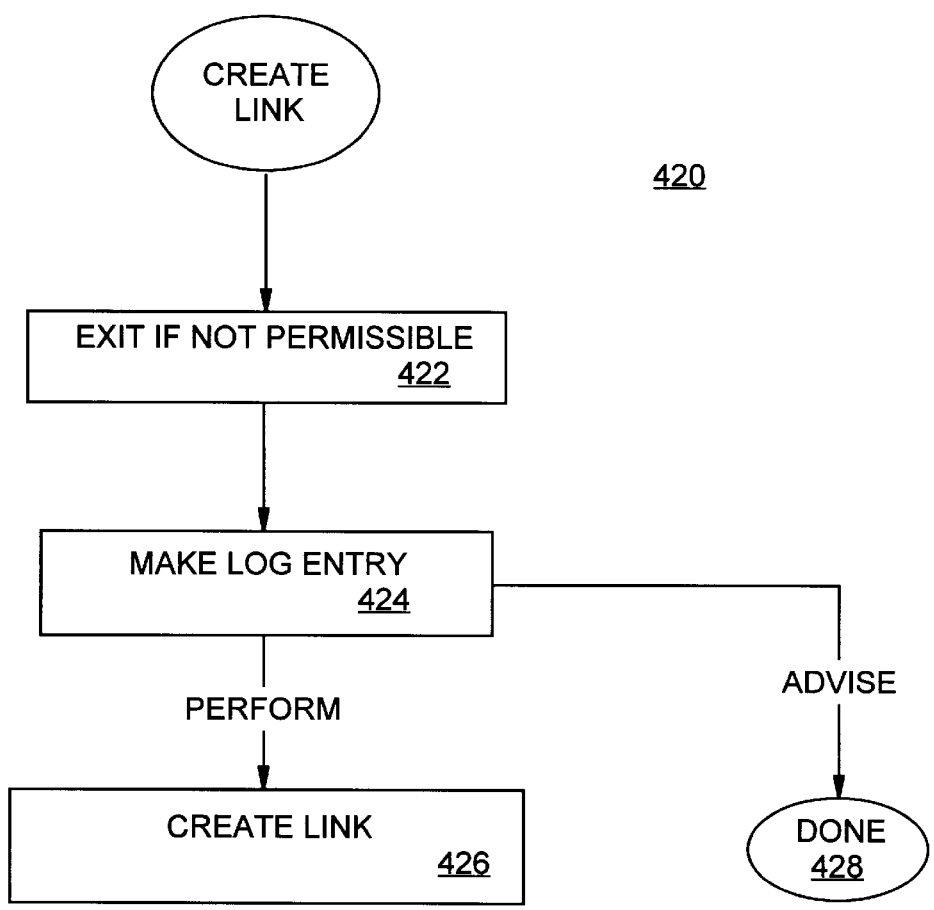
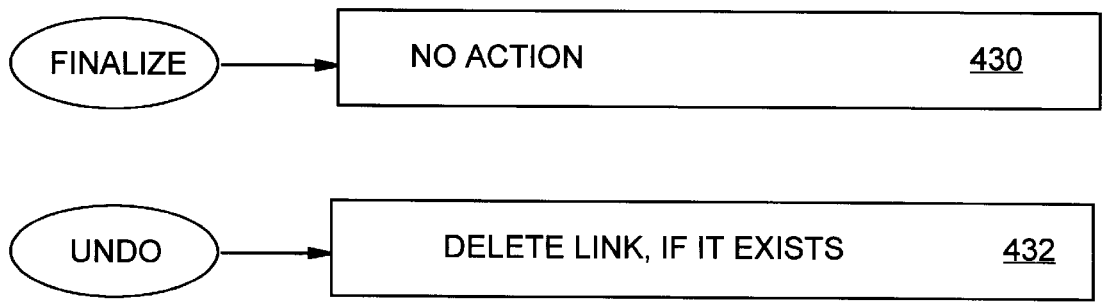
FIG. 11

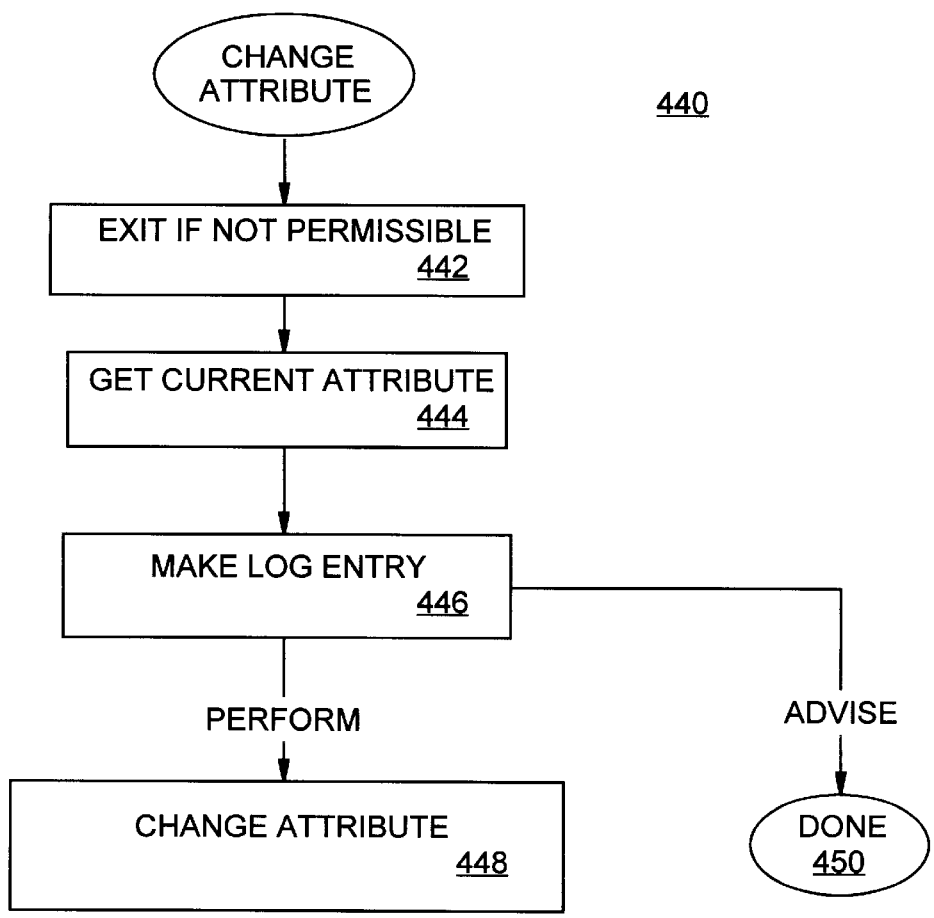
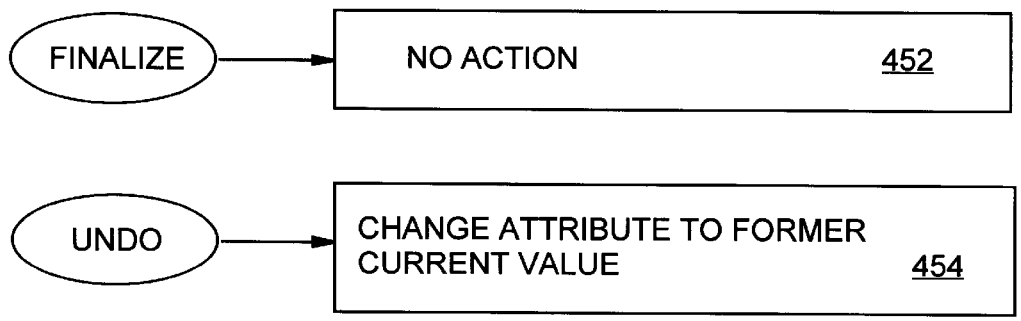
FIG. 12

FIG. 14
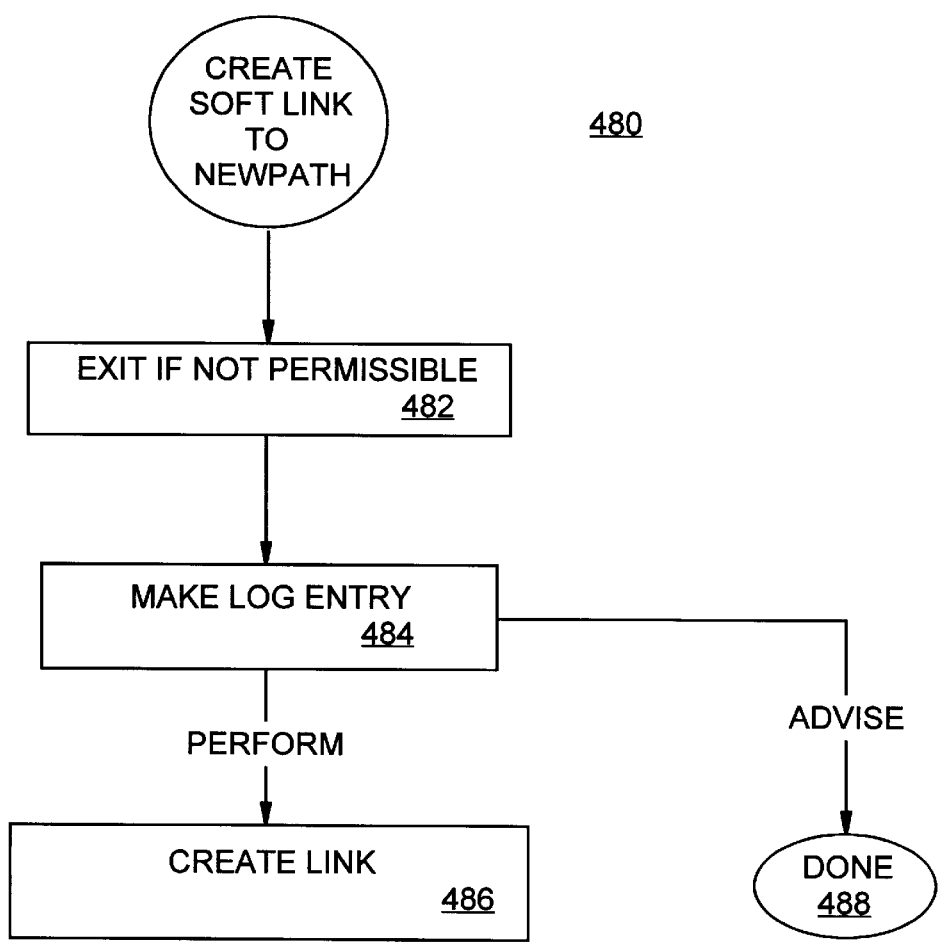
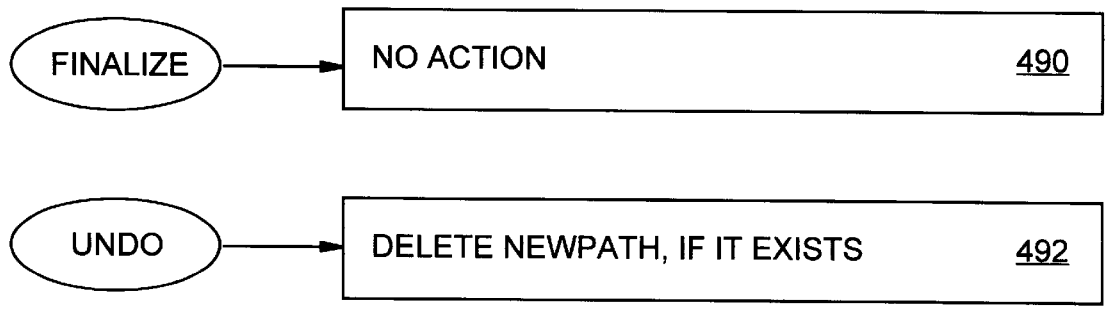

RESTORING THE STATE OF A SET OF FILES

BACKGROUND OF THE INVENTION

1. Field of the Invention

The present invention relates to computer file systems, and more particularly to methods and systems for providing transactional semantics to file system operations in parallel processing systems.

2. Background

Computational speeds of single processor computers have advanced tremendously over the past three decades. However, many fields require computational capacity that exceeds even the fastest single processor computer. An example is in data warehousing, where data volumes are so large that even the simplest operations may take days to complete on the fastest available uniprocessor computer. Accordingly, a variety of "parallel processing" systems have been developed to handle such problems. For purposes of this discussion, parallel processing systems include any configuration of computer systems using multiple central processing units (CPUs), either local (e.g., multiprocessor systems such as SMP computers), or locally distributed (e.g., multiple processors coupled as clusters or MPPs), or remotely distributed (e.g., multiple processors coupled via LAN or WAN networks), or any combination thereof.

Complex data processing applications running on parallel processing systems typically make changes to multiple external collections of data (files, databases, etc.), usually by a combination of file manipulation operations (such as creating, deleting and renaming) and data manipulation operations (such as reading and writing). Such applications do this by running one or more programs either concurrently or sequentially. If a failure occurs, partial changes may have been made to the external collections of data, which render that data unusable by the current application or other applications until corrected. Typically, this will happen if a file has been modified, deleted, or created in the course of a computation. In parallel processing systems, the problem is intensified since the collection of data will often be spread over many different nodes and storage units (e.g., magnetic disks), making the work required to "roll back" the state of the data increase proportionately with the number of storage units.

To recover from such failures, it is necessary to shut down the current (i.e., failed) application, and then either:

(1) undo all changes made by the application since its start (a "fall rollback"), or (2) restore the state of the system to an intermediate "checkpoint" and restart execution from that point (a "partial rollback").

One familiar method for dealing with such situations is to restore the prior state of the system manually, by removing junk files, for example. A shortcoming of such solutions is that they may require the participation of individuals familiar with the operation of the failed program, and that there is no guarantee that the proper corrective action will be taken. The problems are magnified in parallel processing systems, where a computation may be spread over multiple processors and the computation may have reached different points on different machines. In such cases, manual intervention may be required for every program participating in the computation and a single error may prevent the computation from being restarted successfully.

Another familiar solution to such problems is to build applications using databases and database management systems that allow groups of operations to be grouped into transactions. All operations in a transaction may either be committed (that is, made permanent) as a group, or rolled back (that is, undone) as a group. In addition, an integrity preserving protocol, such as the well-known "two-phase commit" protocol, may be used to ensure that, in cases where multiple machines are used to run the application in a parallel processing system, transactions may be spread across multiple machines with the database management system ensuring that either all operations on all machines are committed or all operations on all machines are rolled back.

Unfortunately, many applications are not written using databases and even those that do may still access and modify data stored in files using conventional file system operations. Accordingly, there is a need for a method by which operations on files may participate in an integrity preserving protocol, such that either all changes made to the file system by those applications are committed or all such changes are rolled back.

Referring to FIG. 1*a* through FIG. 1*c*, transaction processing in database systems is often implemented using some variant on the following method. First, a central transaction master, whose actions are shown to the left of the vertical separator, issues a start transaction command (Step 20). The transaction master then sends messages to various agents (Step 22), causing the recipient agents to perform actions (Step 24). Such messages normally include an identifier for the transaction and a variety of methods are available for the sending of messages, such as remote procedure calls (RPCs) and inter-process communication mechanisms. Agents may, at various times, send messages back to the master (to confirm completion of an action, for example). Whenever an agent performs an action that modifies any permanently stored data (e.g., a disk file) (Step 26), the agent uses a reliable atomic procedure to append a log entry to a log, typically a log file (Step 28). The agent may also, and optionally, save additional auxiliary information to supplement the log file entry, so that it is possible to undo the effects of the action (Step 30). The log entry serves as a note that, in the event of a failure, the action must be undone. The log entry typically contains the identifier of the transaction under which the operation was performed.

Eventually, one of the following will take place:

1. the transaction master requests that the transaction be committed (i.e., made permanent); or
2. the transaction master requests that the transaction be rolled back (i.e., undone); or
3. if the transaction master exits without performing either action (e.g., due to a software failure), the system generates a roll back request on behalf of the transaction master.

In cases 1 and 2, the decision is logged for use in the event of a failure of some kind.

To commit a transaction (Step 32), the transaction master engages (Step 34) a commit protocol, such as the two-phase commit protocol, to be executed by the agents (Step 36). If this protocol succeeds, commit processing continues (proceeds) (Step 40); otherwise, a roll back command is generated and the transaction is rolled back (Step 46). If the commit proceeds, each agent steps through its log (Step 40), and for each action belonging to the transaction being committed, a finalize routine may be invoked which will have the effect of erasing the auxiliary information which was saved to enable roll back processing (Step 42). When all log entries have been processed, the commit operation is complete (Step 44).

To roll a transaction back (Step 46), the transaction master broadcasts a roll back message (including the identifier for the transaction) to all agents that participated in the transaction (Step 48). Each agent steps through its log (Step 50), and for each operation belonging to the transaction being rolled back, an undo routine may be invoked which will have the effect of undoing the effects of the original operation (Step 52). When all log entries have been processed, the roll back operation is complete (Step 54).

To deal with a system failure, a recovery utility may be used (Step 56). For every transaction active in the system (Step 58), the recovery utility examines bookkeeping information produced by the master-agent commit protocol (Step 62) to determine whether a decision had been made to commit the transaction (Step 64). If so, commit processing is begun or resumed, as appropriate, at Step 40, where each agent steps through its own log and any necessary finalize routines are executed. Otherwise, the roll back process at Step 46 is performed for the transaction, where each agent steps through its own log and any necessary undo routines are executed.

A problem of the prior art is that no generalized method exists for applying the techniques of database transaction processing to non-database applications such that manual restoration of file state is substantially reduced or eliminated if a failure occurs. Accordingly, there is a need for a method and system that applies transaction techniques to file system operations in non-database applications executing on parallel processing systems. The present invention provides such a method and system.

SUMMARY OF THE INVENTION

The invention provides a method and system that applies transaction techniques to file system operations in non-database applications executing on parallel processing systems. For each of a set of file operations, methods embodied in program routines are defined for performing, finalizing, and undoing the operations, so that the operations may be used in a non-database application to create a transaction processing environment.

In general, in one aspect, the invention provides a computer program library for adding the semantics of transactions to a set of native operations of a native file system. The library comprises a set of one or more families of routines, each such family of routines corresponding to at least one native operation, each such family of routines including:

(a) a Perform routine including instructions for providing the functional equivalent of one of the family's corresponding native operations while preserving information necessary to roll back such native operations;

(b) a Finalize (commit) routine including instructions for committing the result of the corresponding perform routine; and (c) an Undo (roll back) routine including instructions for rolling back the result of the corresponding perform routine.

In cases where it is not possible to modify a program to incorporate the Perform operation, the invention provides for an external agent to execute an Advise routine on the program's behalf. This Advise operation preserves information necessary to undo or roll back an operation, but stops short of performing the operation itself. Once the Advise operation has been executed, the program performs the actual operation. Once this has been done, the Finalize or Undo operation may be executed (e.g., by the external agent), as appropriate.

The invention has a number of advantages. For example, the invention provides the addition of transactional semantics to a set of file operations in a way that supports use in distributed, parallel, and remote computing environments. In addition, the invention provides a transactional mechanism that can be added to traditional batch-processed applications. Further, the invention provides a method by which operations on files may participate in a two-phase commit protocol, such that either all changes made to the file system by those applications are committed, or all such changes are rolled back.

For a fuller understanding of the nature and further advantages of the invention, reference should be made to the detailed description taken in conjunction with the accompanying drawings.

BRIEF DESCRIPTION OF THE DRAWING

The accompanying drawings, which are incorporated in, and constitute a part of, the specification, schematically illustrate specific embodiments of the invention and, together with the general description given above and the detailed description of the embodiments given below, serve to explain the principles of the invention.

FIGS. 1a, 1b, and 1c are flow diagrams illustrating a prior art distributed transaction processing method.

FIG. 7 is a flow diagram of a family of routines in accordance with the present invention for the native file operation of opening and appending to a file.

FIG. 11 is a flow diagram of a family of routines in accordance with the present invention for the native file operation of creating a link.

FIG. 12 is a flow diagram of a family of routines in accordance with the present invention for the native file operation of changing an attribute.

FIG. 14 is a flow diagram of a family of routines in accordance with the present invention for the native file operation of creating a soft link.

Like reference numbers and designations in the various drawings indicate like elements.

DETAILED DESCRIPTION

Throughout this description, the preferred embodiment and examples shown should be considered as exemplars, rather than as limitations on the present invention.

Overview of Transactional File Operations

The present invention provides a set of file and directory operations that augment or supplant "native" file and directory operations of a native file system. For purposes of illustrating the concepts and principles of the invention, the well-known UNIX file system will be assumed as the native file system.

Under UNIX, a "path" is a normal UNIX filename in the form "/dir/dir/dir/filename". A "mode" is a UNIX protection mode attribute that specifies whether a file is any of, for example, readable, writable, or executable, or whether a directory is any of, for example, readable, writable, or usable to find files it contains.

Under UNIX, opening a file can have different effects, depending on a flags parameter and on whether the file already exists. The typical possibilities are as follows:

Open and create. If the "create" flag is set and the file does not exist, then the file will be created.

Open for append. If the "append" flag is set and the file already exists, then the file will be opened in a mode such that all data written to the file will be appended to its end.

Open with truncate. If the "truncate" flag is set, then the file will be opened and truncated to a length of zero.

Open for update. If the "write" flag is set but neither "append" nor "truncate" is set, then the file is opened in a mode such that data may be written to any arbitrary point within the file.

Open for read. If the "read" flag is set and the file exists, then the file is opened in a mode such that no modifications may be made to the file or its contents. (Since this guarantees that no changes will be made to the file, no log entry needs to be generated, and no commit or roll back information needs to be saved.)

In the following description, the term "path" will be used in the UNIX sense of a file name. However, adopting this usage is not in any way intended to limit the invention to UNIX embodiments. Further, by common usage, the term "path" may also be used, in a form of shorthand, to refer to the named file itself. Whether a file name or a file is indicated is determined from the context.

Figure 1A:
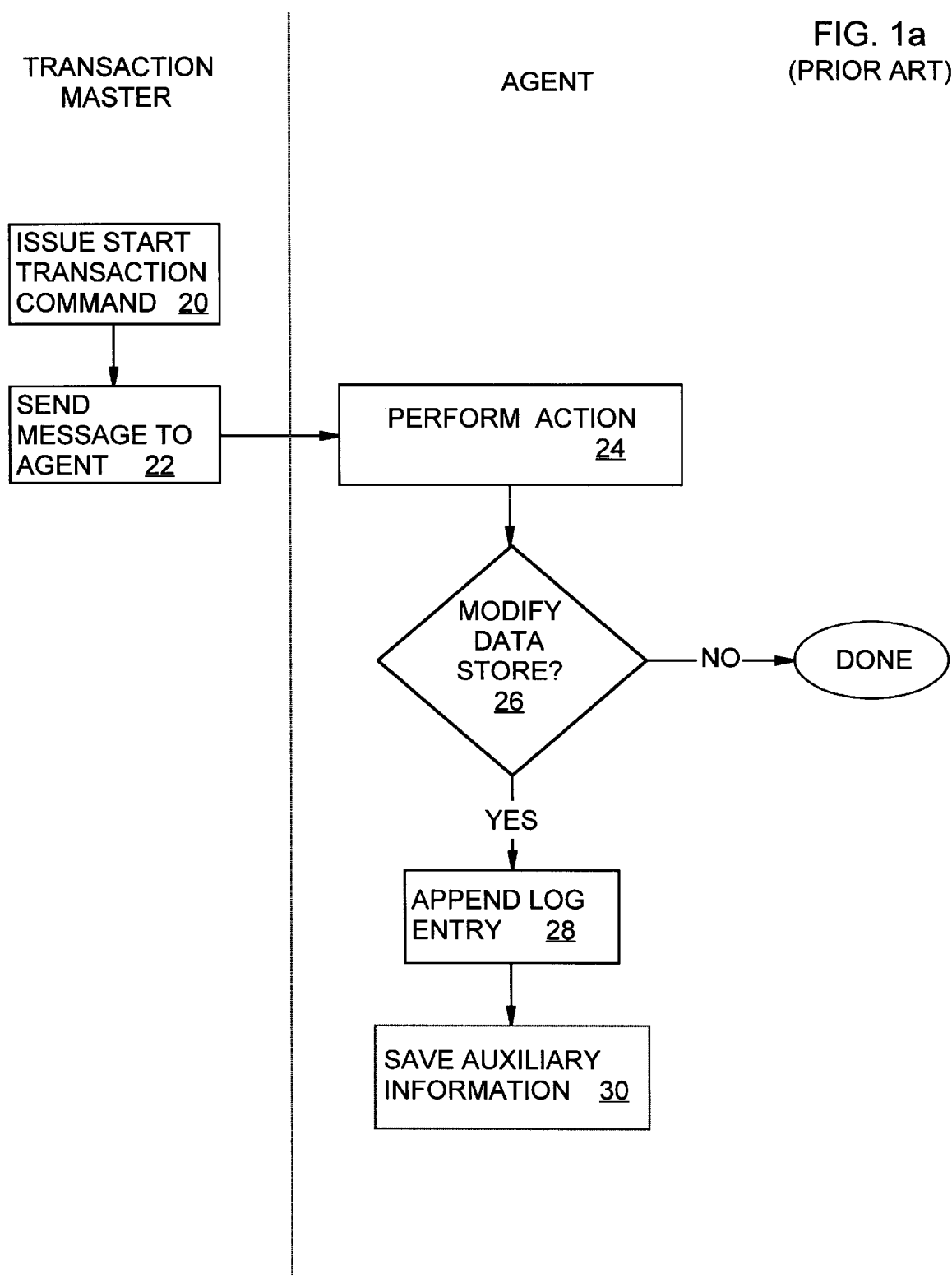
Figure 1C:
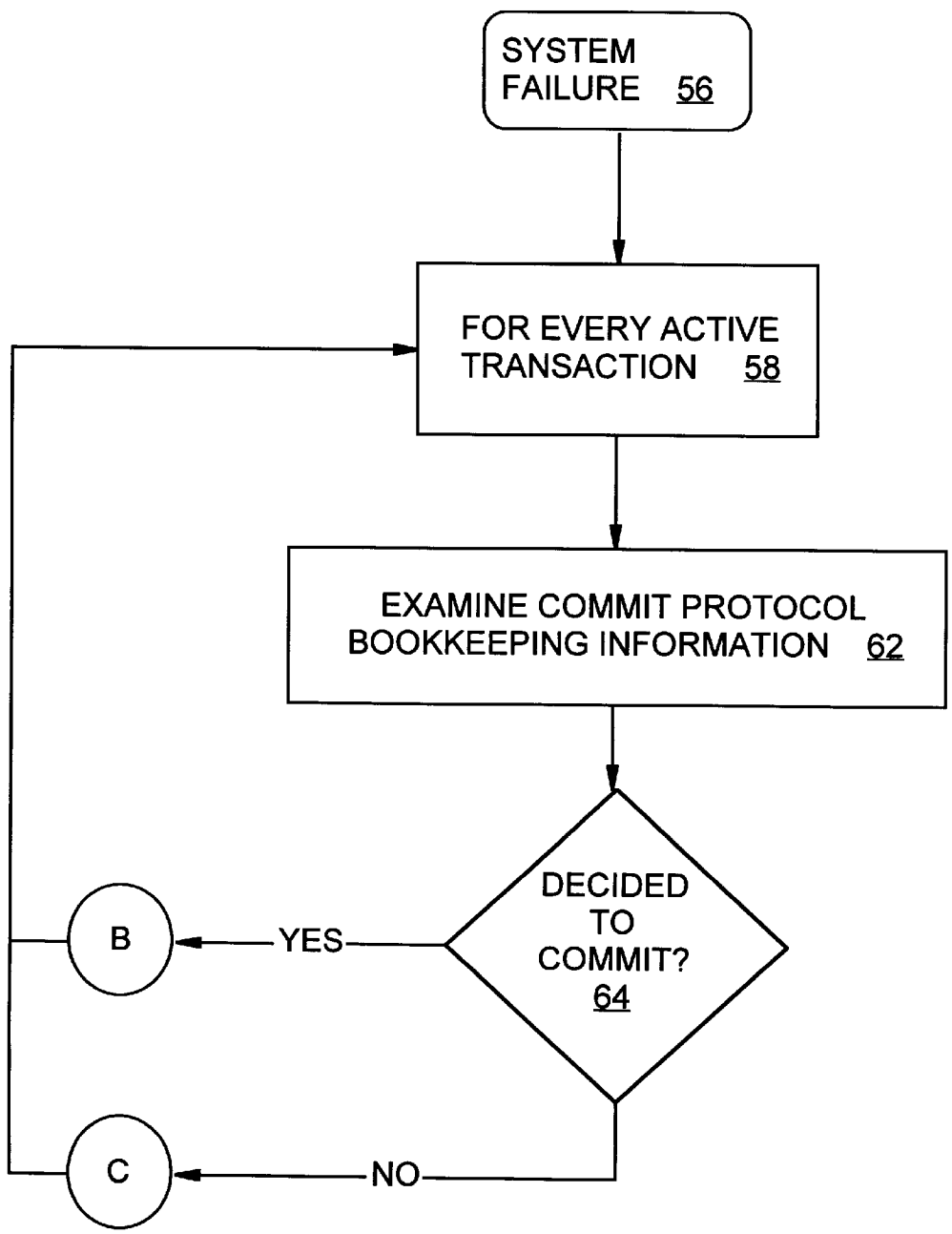
Figure 2:
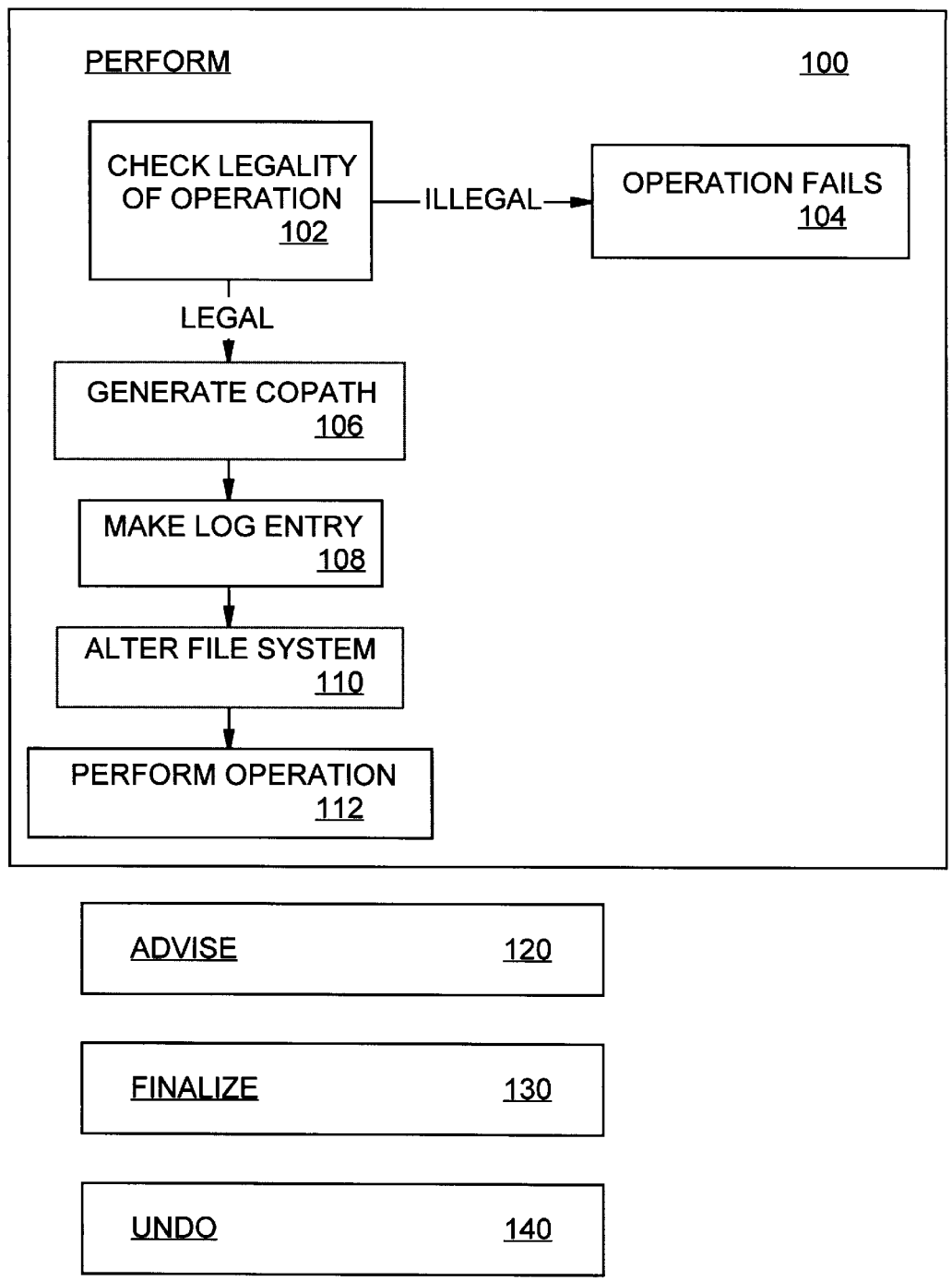
FIG. 2 is a flow diagram illustrating elements of a method for restoring the state of a set of files in accordance with the present invention.

Each transactional file operation of the present invention actually comprises a family of routines that promote transactional semantics for each native file system operation that alters the state of the file system. Referring to FIG. 2, each transactional file operation includes a Perform routine 100, an optional Advise routine 120, a Finalize routine 130, and an Undo routine 140.

A Perform routine 100 for an operation takes the same parameters as does the corresponding native routine and generally executes the following steps:

checks the legality of the operation (Step 102), and causes it to fail if illegal (Step 104);

optionally, generates a copath (a name for a cofile, explained below) (Step 106);

makes a log entry by creating the entry and appending it to a transaction log (a log database), the entry containing information needed to commit and roll back, including the information required to call the Finalize and Undo routines, if any (Step 108);

optionally, alters the file system to enable proper operation of the Finalize and Undo routines (Step 110); and finally, performs the operation itself, generally by using native file system operations (Step 112). (In some cases, however, the Perform routine may directly create a cofile and thereby eliminate the need to perform the native operation itself.)

Appending a log entry to the log must be done as an atomic operation that assures the entry is permanent before further processing is done. In one embodiment, this is accomplished by storing log entries in a database having transactional semantics, such that once the log entry has been created, it is guaranteed to survive various sorts of system failures (such as operating system crashes). This database is also used to store transactional identifiers and other state information.

An Advise routine 120 is a routine that generally performs all of the steps performed by a Perform routine 100 except the step of performing the corresponding native file system operation.

A Finalize routine 130 makes the effects of a file operation permanent and generally deletes any corresponding cofile.

An Undo routine 140 undoes the effects of a file operation and generally deletes any corresponding cofile.

A copath is the name (a path) of a cofile, which is defined as a file or a directory (or similar file-system object) used to preserve the contents of another file or directory (or similar file-system object) until an associated transaction is committed. Such preserved information may be restored by an Undo routine or deleted by a Finalize routine. In generating a copath, the following two restrictions must be observed in the preferred embodiment. First, the copath must be in the file system being operated on. Second, the copath must not be the name of a file that already exists, including another cofile. The following steps may be used to assure that these restrictions are met. Preliminarily, the system administrator creates a designated copath directory for each file system. Then, at the start of a transaction, a counter is created and initialized to 0. This counter is made accessible to any routine participating in the transaction. A copath is generated by concatenating the copath directory name, the transaction ID, and the current value of the counter. The counter is then incremented.

A set of families of Perform, Advise, Finalize, and Undo routines for a set of file operations may be deployed in non-database applications in a number of ways. In a first way, the routines are embedded as part of a transaction processing application, using the logging mechanisms that are provided by whatever transactional substrate the application uses. A number of such substrates are available, including transaction monitors such as "Encina", available from Transarc Corporation, and parallel checkpointing systems such as is disclosed in co-pending U.S. patent application Ser. No. 08/570,724, entitled "Methods and Systems for Reconstructing the State of a Computation", assigned to the assignee of the present invention. In this mode of deployment, a single agent executes both the Perform and the Finalize or Undo operation (as appropriate), with the Finalize or Undo operation being performed under control of the transactional substrate's commit protocol.

In a second way of deploying the routines, a runtime library is created containing the routines, plus routines to start, finalize, and undo transactions. An application is then coded to start a transaction at the beginning of execution and to modify files using the Perform routines rather than the native operations. Upon normal termination, the application invokes the commit process, which in turn scans the log and invokes the appropriate Finalize routines. Upon abnormal termination, the application invokes the roll back process, which in turn scans the log and invokes the appropriate Undo routines. In the event of a system failure, a recovery utility is invoked when the system is restored. In this mode of deployment, one agent executes the Perform operation, and a second agent executes a Finalize or Undo operation (as appropriate), with the Finalize or Undo operation being performed under control the transactional substrate's commit protocol.

In a third way of deploying the routines, a runtime library is created containing the Perform routines, plus routines that allow the Perform routines to access a transactional log provided by an external transactional substrate, such as described above. The Undo and Finalize routines are embedded in the substrate so that they may be accessed during commit and roll back processing. In this way, applications that function as a part of a larger transactional application may be created.

In some cases, it is not practical to incorporate the Perform operation into a program (e.g., if the source code is not available). In such cases, the invention may be implemented by having an external agent execute one or more Advise operations, and then starting the program, which will execute one or more native file system operations (generally corresponding to the Advise operations performed on its behalf). The external agent then performs a Finalize or Undo operation (as appropriate), with the Finalize or Undo operation being performed under control of the transactional substrate's commit protocol.

At least three options are available for implementing the transactional routines. With the first option, the required routines are provided as a separate set of routines that must be specifically called. With the second option, the required routines are provided as a set of routines mimicking and overriding normal file system operations. With this option, no source-code modification is required; only re-linking of the application is needed. With the third option, the required routines are embedded in the operating system; re-linking of the application is not needed. All of the above options are applicable to any of the deployment modes noted above.

Commit/Roll Back Processes

Figure 3:
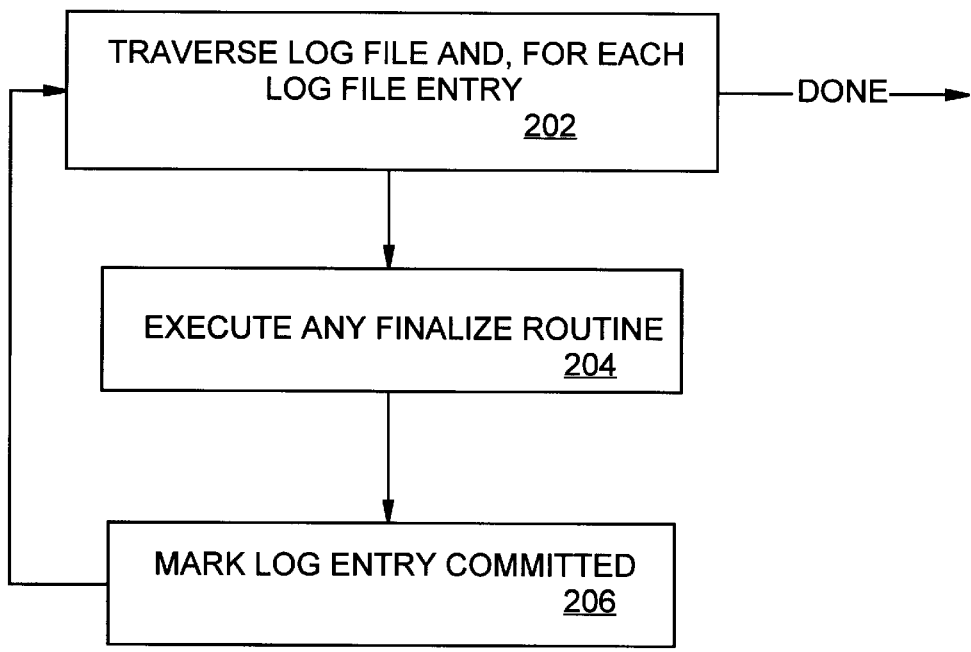
FIG. 3 is a flow diagram of a commit processing loop in accordance with the present invention.

Referring to FIG. 3, a commit process traverses a log file (appended to in Step 108 of most transactional operations) (Step 202), performing any Finalize routines in each log entry (i.e., for each operation with a Finalize routine logged in the log file) (Step 204). To assure correct operation if a failure occurs during commit processing and the commit process must be restarted, Finalize routines should be coded so that they can be executed more than once, no matter where in their processes they were interrupted (including after all processing is completed). After each operation is committed, the corresponding log entry in the log file preferably is marked as committed to prevent double commits, for efficiency (Step 206). Normally, the log file would be traversed in a forward direction, although to the extent commit operations are independent of each other, it is not necessary to do so.

Figure 4:
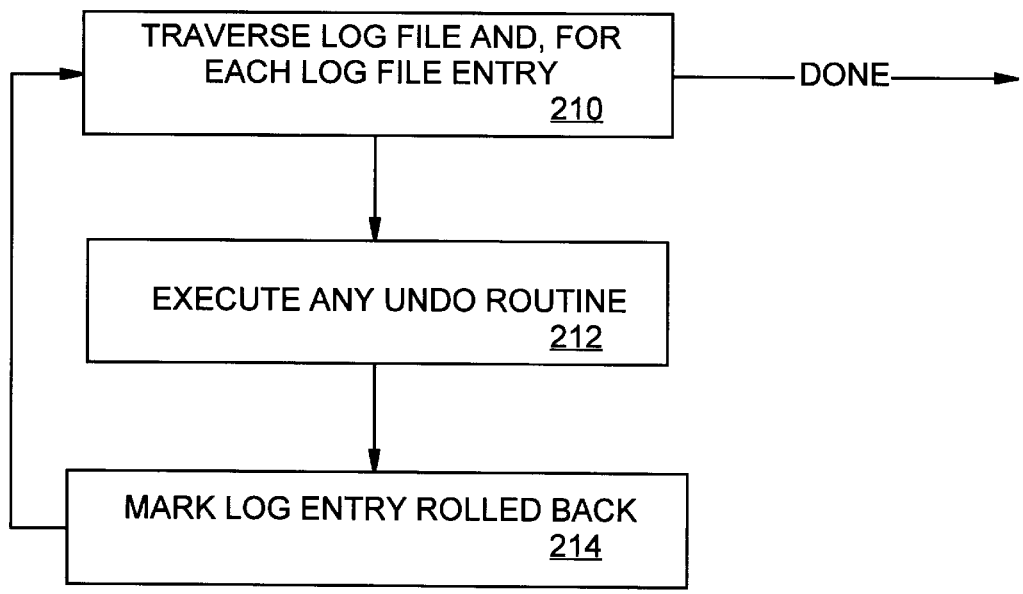
FIG. 4 is a flow diagram of an undo or roll back processing loop in accordance with the present invention.

Referring to FIG. 4, to roll back all file operations in a transaction, the roll back process traverses a log file (Step 210), performing any Undo routines in each log entry (Step 212). To assure correct operation if a failure occurs during roll back processing and the roll back process must be restarted, Undo routines should be coded so that they can be executed more than once, no matter where in their processes they were interrupted (including after all processing is completed, as long as the roll back of all later operations has been completed and, preferably, the rollback of earlier operations has not been started). After each operation is rolled back, the log entry preferably is marked as rolled back to prevent double roll backs, for efficiency (Step 214). Normally, the log file would be traversed in reverse order for roll back processing, although to the extent roll back operations are independent of each other, it is not necessary to do so. In a distributed or parallel environment incorporating multiple hosts/agents, the commit and roll back operations, once invoked, are performed independently. As noted above, a distributed commit protocol (e.g., two-phase commit) is used to ensure that the appropriate operations are invoked at the appropriate times.

Transactional File Operations

With this understanding of the basic structure of Perform, Advise, Finalize, and Undo routines, and of the basic commit/roll back process, the following sets forth the preferred embodiments of specific transactional file operations ("fileops") coming within the scope of the invention.

FileOp - Remove a Directory

The file operation of removing (or deleting) a directory from a file system, such as the UNIX file system, requires that the target directory be empty. The challenge in this operation is that a conventional Undo routine may not be able to recreate the directory once it has been deleted. For example, under the UNIX operating system, if a directory owned by a different user is deleted, that directory cannot be recreated, since UNIX forbids users (other than the highly privileged root user) from creating directories owned by another user.

Under the present invention, rather than deleting a directory, the Perform routine for this file operation hides the directory by renaming it to a copath. The directory is not actually deleted until commit time.

Figure 5:
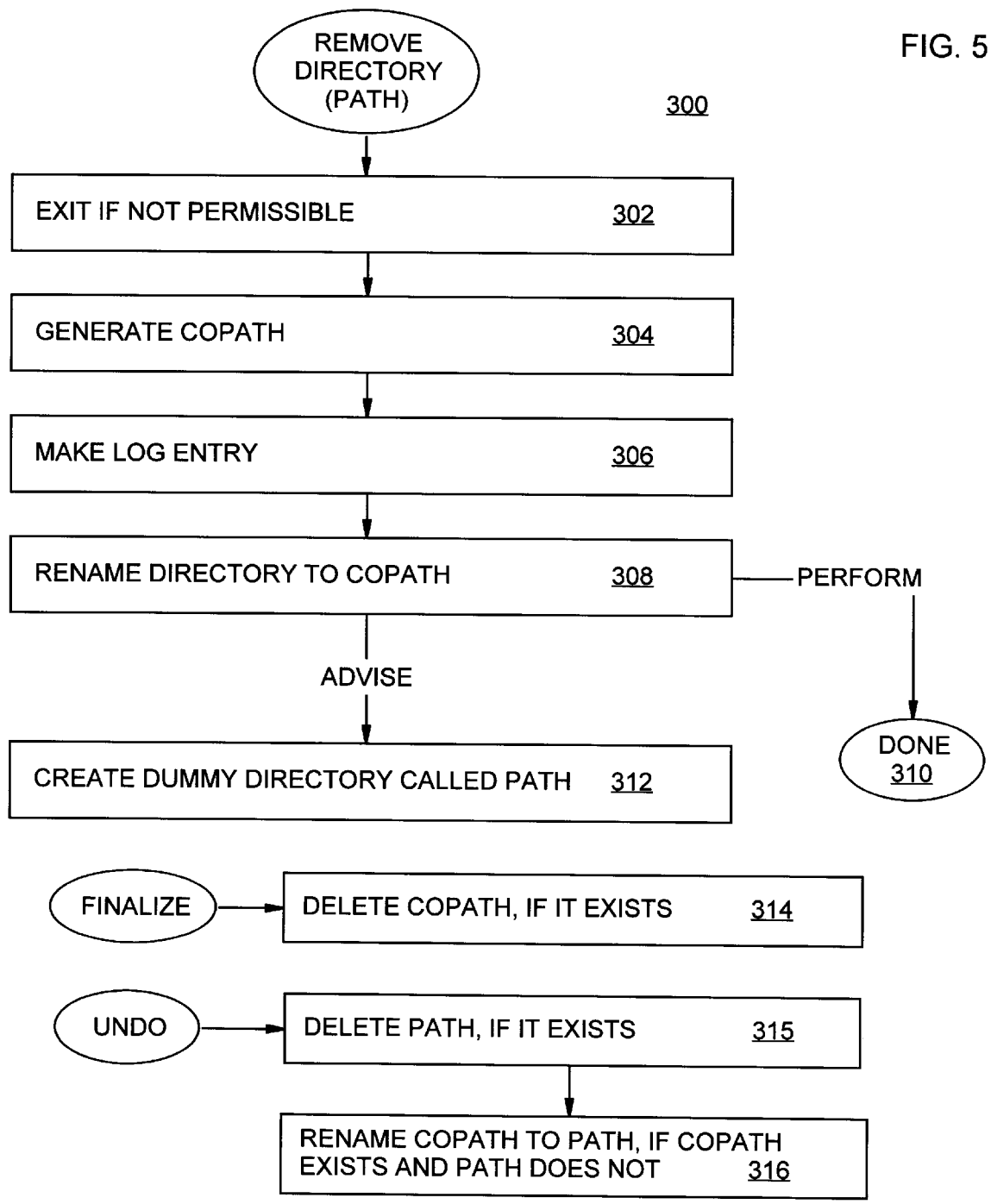
FIG. 5 is a flow diagram of a family of routines in accordance with the present invention for the native file operation of removing a directory.

Referring to FIG. 5, the parameter or "argument" of a remove (delete) directory routine 300 (or operating system call) is Path (i.e., the name of the directory to be deleted). The log entry items specific to this operation are (1) Path, the name of the directory to be deleted and (2) the copath (the name of a directory that will be used to hide the directory). (Other information such as a transaction identifier and bookkeeping information, will be part of every log entry. Such information will not be mentioned in the description that follows.)

The Perform and Advise routines begin by checking whether the operation is permissible (legal) and exiting if it is not (Step 302). The file operation is impermissible if Path does not refer to a directory, or if the user does not have permission to delete the directory, or if the directory Path is not empty (a directory that contains only cofiles (see below) is considered to be empty). Next, the routines generate a copath named CoPath (Step 304). The routines then create a log entry and append it to the log (Step 306). Next, the routines rename the original directory Path to CoPath (Step 308). At this point the Perform routine is done (Step 310). The Advise routine has one further step, which creates a dummy directory called Path to make it appear that the original directory still exists (Step 312).

The Finalize routine, executed during the commit protocol, deletes CoPath if it exists (Step 314). (Since a copath, like a path, is a name, this shorthand means that the copath directory named CoPath is deleted.)

The Undo routine, executed during the roll back protocol, deletes Path if it exists (Step 315), and renames the copath directory CoPath to Path if it exists, thus restoring the state of the original directory prior to the Perform or Advise routines (Step 316).

All of the functions in the Perform, Advise, Finalize, and Undo routines use appropriate native file operations in the preferred embodiment.

It will readily be seen how these routines provide transactional semantics. The Perform and Advise routines exit if the operation is illegal (Step 302). This occurs before any changes might be made to the file system. Thus, no log entry is produced and neither of the Finalize or Undo routines will be invoked. If the operation is legal, a copath is generated (Step 304), and then a log entry is created containing Path and CoPath (Step 306). If the system fails or crashes before the completion of this step, no log entry is produced, no significant changes have been made to the file system, and neither of the Finalize or Undo routines will be invoked.

The Path directory is renamed to CoPath using the native file system rename operation (Step 308). If the system fails or crashes between the creation of the log entry and this step, the subject directory will not have been renamed from Path to CoPath. When the Undo operation is performed, the rename operation (at Step 316) fails because CoPath does not exist. This is harmless because there is not actually anything to undo.

If the Undo process is performed after the completion of Step 308, that is, after Path has been renamed to CoPath, the log entry will be found and the Undo routine will rename CoPath to Path, restoring the file system to its prior state.

The Finalize action for this transactional operation includes deleting CoPath, using native file system operations, if CoPath exists (Step 314). It is now no longer possible to roll back the transactional operation.

FileOp - Create Directory

Figure 6:
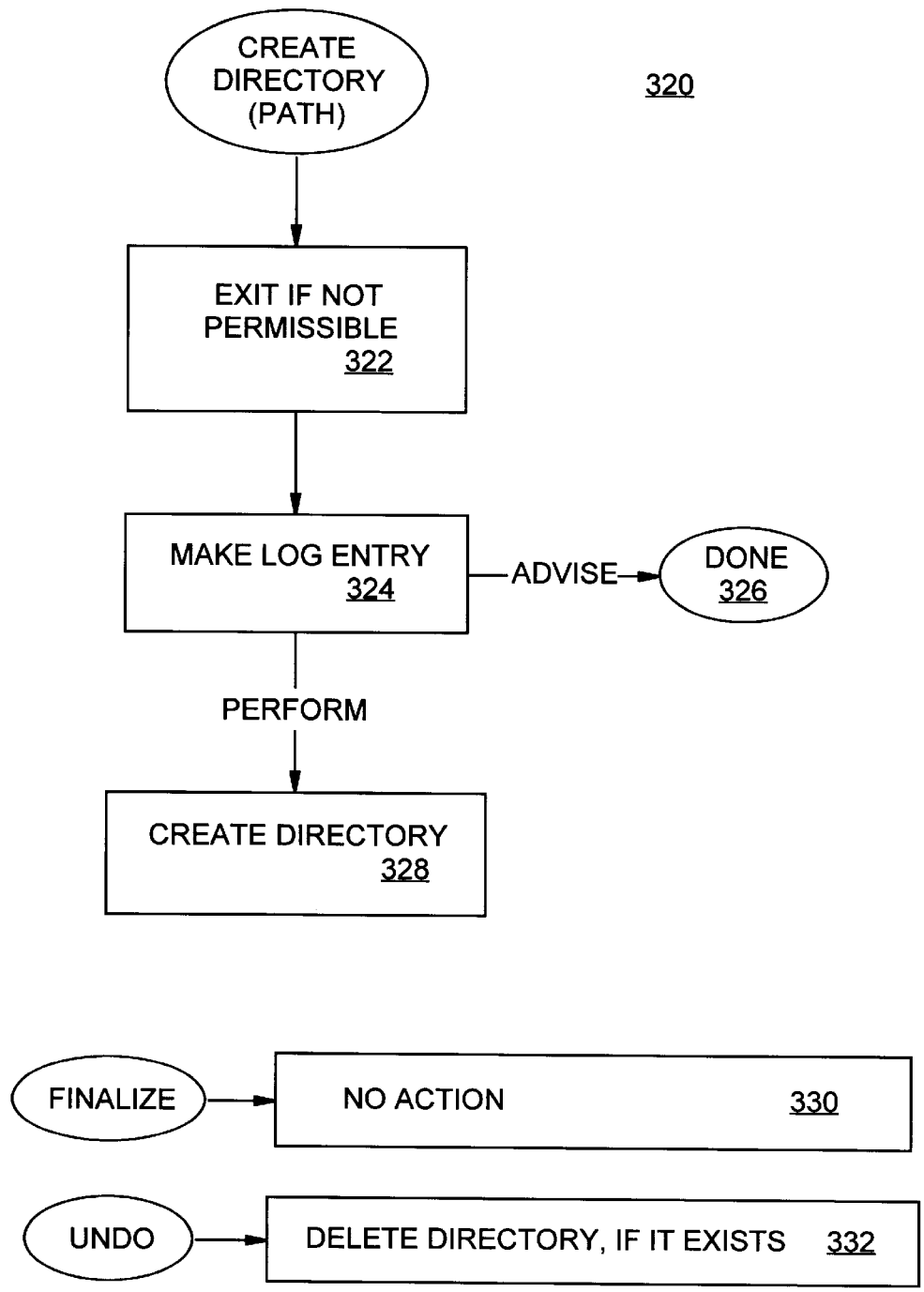
FIG. 6 is a flow diagram of a family of routines in accordance with the present invention for the native file operation of creating a directory.

Referring to FIG. 6, a create directory operation 320 creates a directory in the file system. The arguments for this operation are Path, the name of the directory to be created, and Mode, the protection-mode of the directory to be created. The log entry item specific to this operation is the path.

The Perform and Advise routines begin by checking whether the operation is permissible and exiting if it is not (Step 322). The operation is impermissible if Path exists or if the user does not have permission to create the directory. Next, the routines create a log entry and append it to the log (Step 324). Next, the Perform routine creates the directory (Step 328), while the Advise routine is done (Step 326).

The Finalize routine takes no action (Step 330). The Undo routine deletes the directory, if it exists, using the appropriate native file system operation (Step 332).

FileOp - Create and Open

The create and open file operation creates a file and opens it. The steps of the Perform, Advise, Finalize, and Undo routines correspond to those of the routines for creating a directory, with the difference that this operation opens and creates a file rather than creating a directory. The specifics of the routines for this operation are therefore as set forth above in reference to FIG. 6.

FileOp - Open for Append

Referring to FIG. 7, the open for append operation 340 opens a file such that all writes will be made to the end of the file. This operation guarantees that data already in the file will not be modified. The arguments for this operation are Path, the name of the file to be appended to. The log entry items specific to this operation are Path and FileLength, the length of the file prior to the append operation.

The Perform and Advise routines begin by checking whether the operation is permissible and exiting if it is not (Step 342). The operation is impermissible if Path does not exist, or if Path refers to a directory, or if the user does not have permission to write to the file. Next, the routines obtain the current length of the file using the appropriate native file system operation (Step 344). Next, the routines create a log entry and append it to the log (Step 346). Next, the Perform routine opens the file for append (Step 350), while the Advise routine is done (Step 348).

The Finalize routine takes no action (Step 352). The Undo routine truncates the file to its former length using the native file system operation and FileLength from the log file (Step 354).

File Op-Open with Truncate

Figure 8:
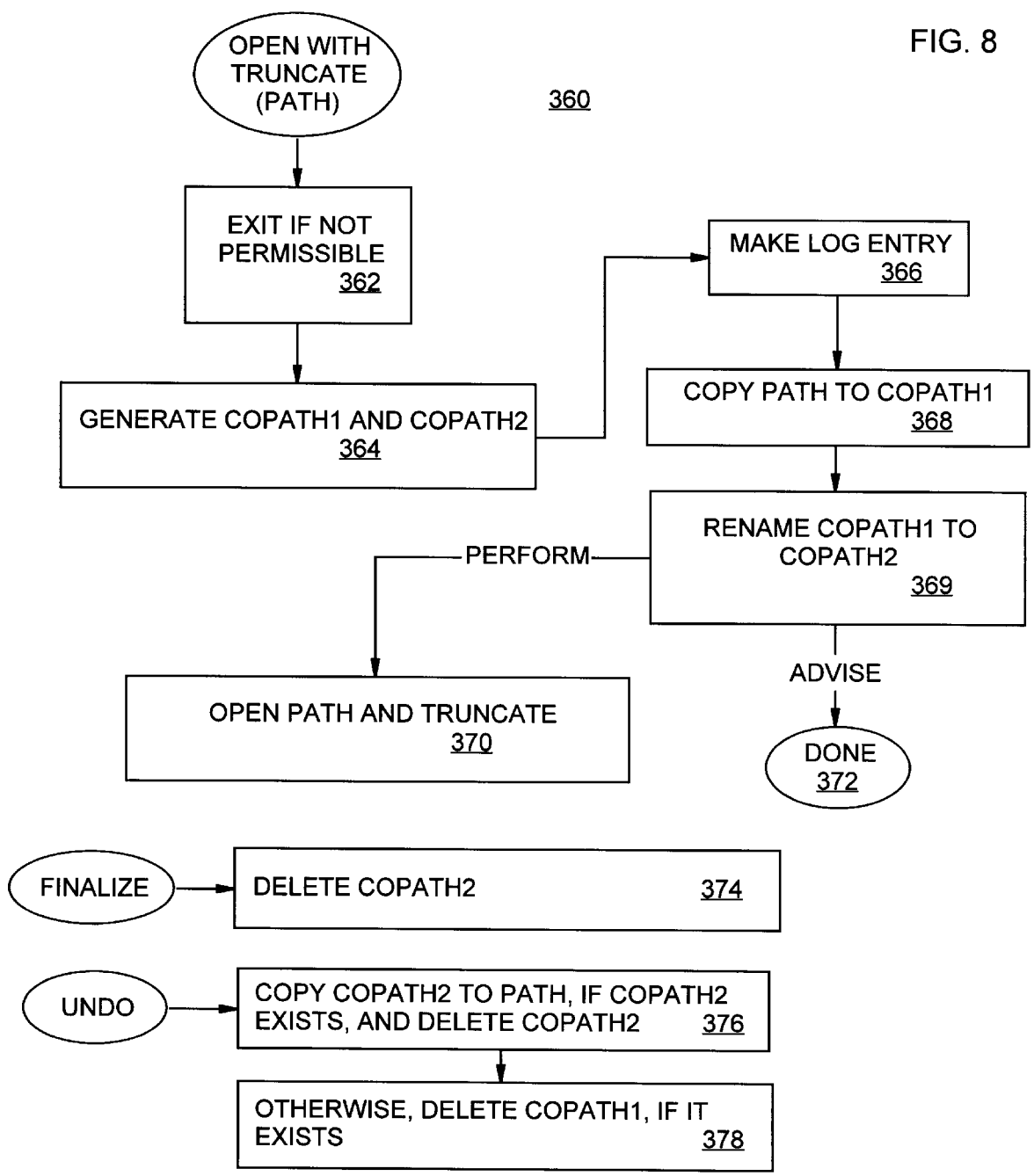
FIG. 8 is a flow diagram of a family of routines in accordance with the present invention for the native file operation of opening and truncating a file.

Referring to FIG. 8, the open with truncate operation 360 opens a file and truncates it to a length of zero bytes. To support roll back, a copy of the file's contents are saved. In the event of a roll back, the file's contents are restored. The arguments for this operation are Path and two copaths (CoPath1 and CoPath2), plus the name of the file to be overwritten. The log entry items specific to this operation are Path, CoPath1, and CoPath2.

The Perform and Advise routines begin by checking whether the operation is permissible and exiting if it is not (Step 362). The operation is impermissible if Path does not exist, or if Path refers to a directory, or if the user does not have permission to write to the file.

Next, the routines generate Copath1 and Copath2 (Step 364). Next, the routines create a log entry and append it to the log (Step 366). The routines then read the contents of Path and write them to CoPath1 (Step 368). Next, the routines rename CoPath1 to CoPath2, using the native file system operations (Step 369). This rename operation guarantees that, if CoPath2 exists, it contains the full contents of Path. Next, the Perform routine opens and truncates the file (Step 370), while the Advise routine is done (Step 372).

The Finalize routine deletes CoPath2 using the appropriate native file system operation (Step 374). The Undo routine checks to see whether CoPath2 exists; if it does, then the routine copies the contents of CoPath2 to Path and then deletes CoPatb2 (Step 376). If Copath2 does not exist, the Undo routine deletes CoPath 1, if it exists (Step 378). This second circumstance occurs if the system fails during the copy operation at Step 368.

FileOp - Open for Update

The open for update operation opens a file in a mode such that its contents may be arbitrarily altered. In this case, the contents of the file must be saved exactly as was done for the open and truncate operation described above. The specifics of the routines for this operation are therefore as set forth above.

FileOp - Open with Truncate-Special Case

Figure 9:
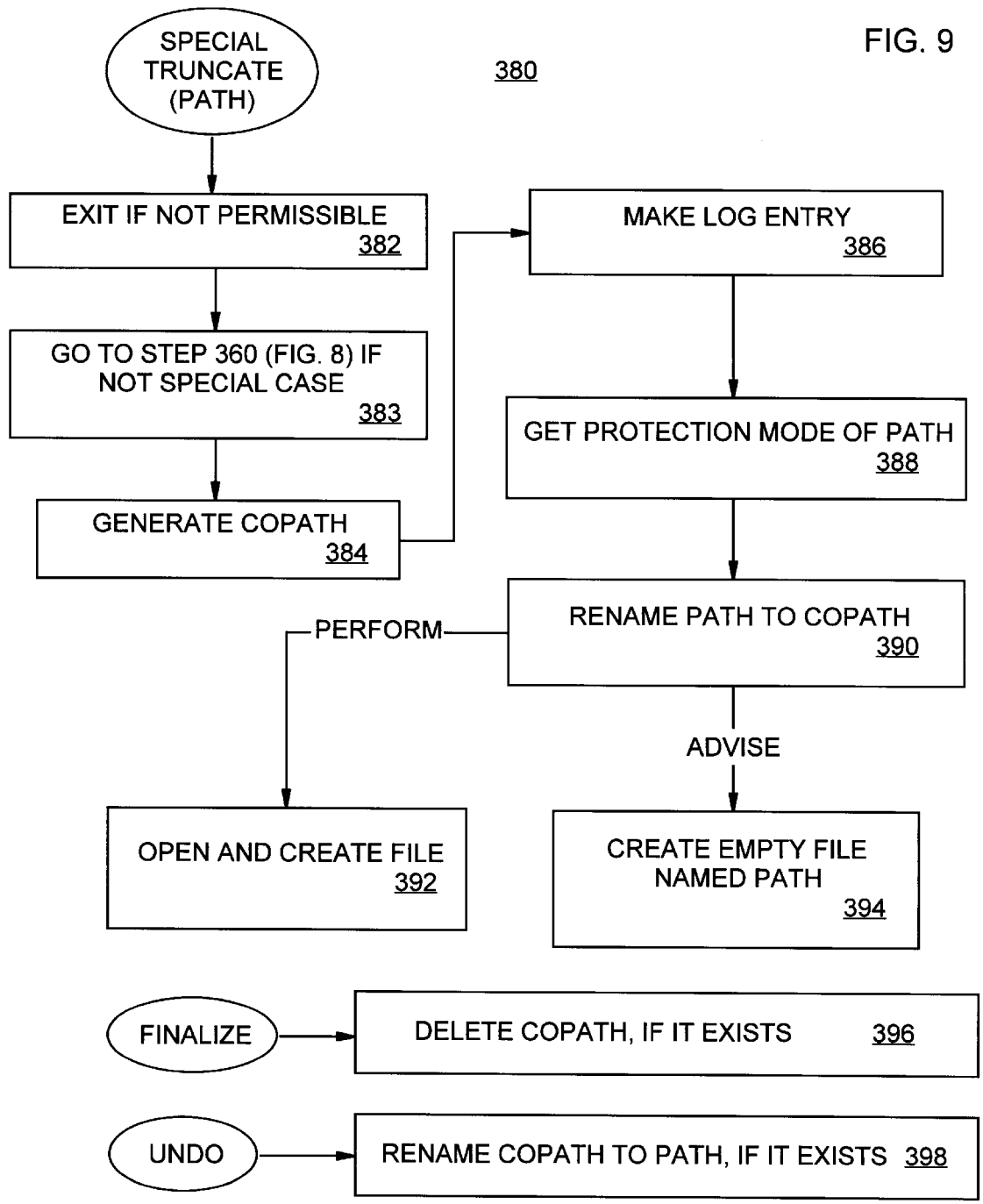
FIG. 9 is a flow diagram of a family of routines in accordance with the present invention for the native file operation of a special case of opening and truncating a file.

In the procedure described above, copying the contents of the file Path may be very time consuming, e.g. , if it holds a large amount of data. Referring to FIG. 9, the information in the file Path can be saved under certain circumstances by simply renaming it to CoPath, then creating an empty file Path. This will not affect the result of the open and truncate operation, since the file ends up empty in either case. The argument for this special truncate operation 380 is Path, the name of the file to be overwritten. The log entry items specific to this operation are Path and CoPath.

The Perform and Advise routines begin by checking whether the operation is permissible and exiting if it is not (Step 382). The operation is impermissible if Path does not exist, or if Path refers to a directory, or if the user does not have permission to write to the file. Next, the general-case algorithm for Open with Truncate operation 360 is used if the special case circumstances are not present (Step 383).

Next, the routines generate a CoPath (Step 384). The routines then create a log entry and append it to the log (Step 386). Next, the routines get the protection mode of Path (Step 388). Next, the routines rename Path to CoPath (Step 390). The Perform routine then opens and creates the file (Step 392), while the Advise routine creates an empty file named Path having the former file's protection mode (Step 394) (this tricks the application into believing that the file had not been renamed in Step 390).

The Finalize routine deletes the copath, if it exists, using the appropriate native file system operation (Step 396). The Undo routine renames CoPath, if it exists, to Path (Step 398).

There are three problem cases in which the special case procedure is not applicable:

A. If the file Path has multiple "hard links" to it, i.e., it has multiple names. If it does, when the new, empty file Path is created in the Perform routine, the new file would not inherit the alternative names for the old file.

B. If the file Path is not owned by the current user. Opening and creating a file in Step 392 of the Perform routine would create a file owned by the current user, even if the file Path was originally owned by another user.

C. If the current user does not have permission to rename the file Path. It is possible that the user has permission to write to a file but not to rename it. This would cause Step 390 of the Perform routine to fail.

Problems B and C may be solved by arranging for the operations noted above to run in a privileged mode (e.g., as the root user), so that restrictions on permissions are not an issue. Problem A may be solved by adding the following steps after Step 392 of the Perform routine: First, scan the file system for all hard links that refer to the newly renamed copath. Then, alter all such links to refer to the newly created path instead of the copath, using the create link operation, described below, so that the operation will be rolled back properly.

FileOp - Unlink

Figure 10:
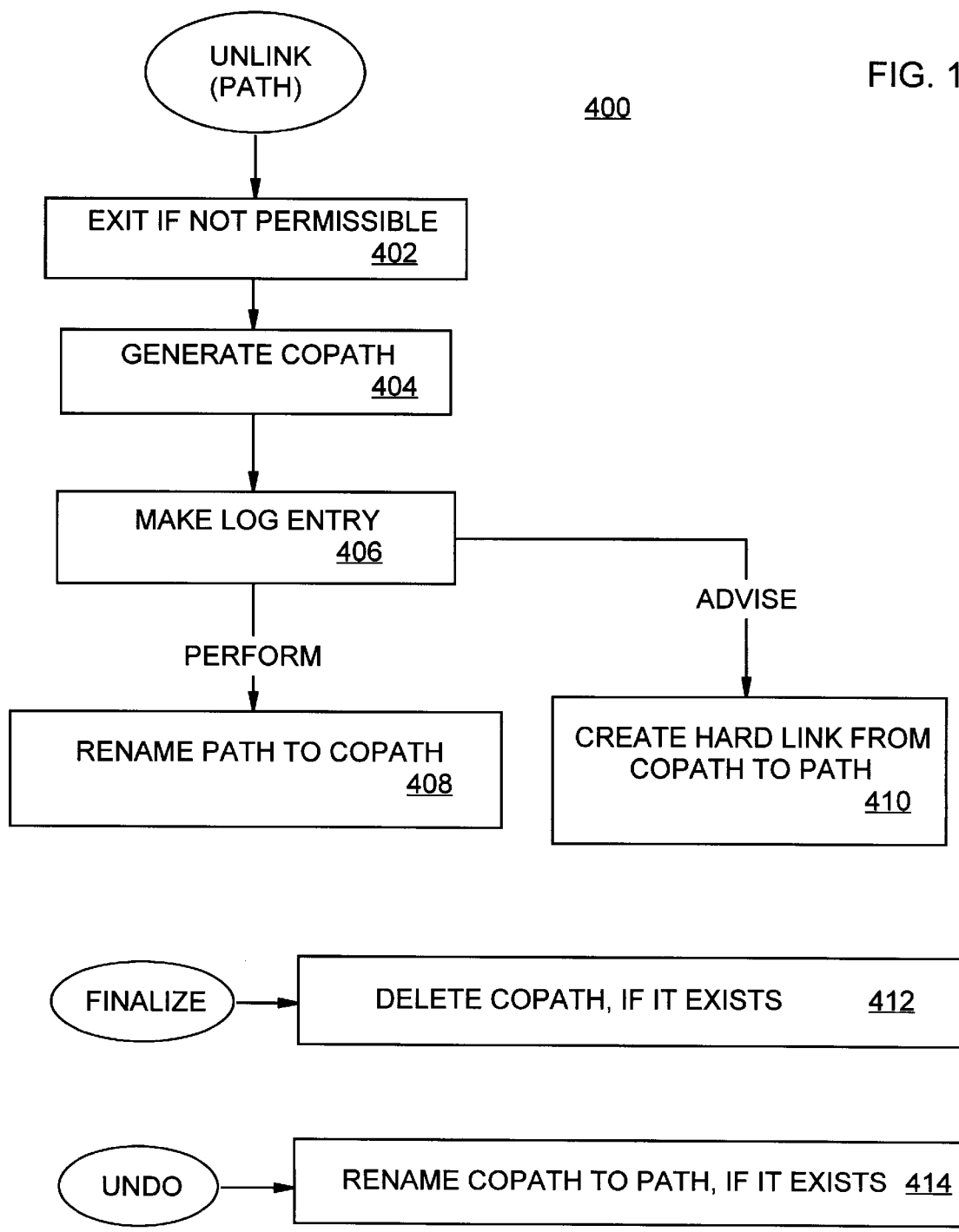
FIG. 10 is a flow diagram of a family of routines in accordance with the present invention for the native file operation of unlinking (deleting) a file system object.

Referring to FIG. 10, the unlink operation 400 deletes a file. It also deletes hard links, soft links, named pipes, and other file-system-resident objects (except for directories). The Perform routine renames the object rather than actually deleting it, i.e., it hides the object and deletes it at commit time. The Advise routine preserves the object and its contents by creating an extra hard link to the object about to be unlinked. This preserves the object until the Finalize routine is run. The arguments for this operation are Path, the name of the object to be deleted. The log entry items specific to this operation are Path and CoPath, the name of a file to preserve the original object.

The Perform and Advise routines begin by checking whether the operation is permissible and exiting if it is not (Step 402). The operation is impermissible if Path does not refer to a file or other permissible object, or if the user does not have permission to delete the object. Next, the routines generate a CoPath (Step 404). The routines then create a log entry and append it to the log (Step 406). Next, the Perform routine renames Path to CoPath (Step 408), while the Advise routine creates a hard link from CoPath to Path (Step 410).

The Finalize routine deletes the copath, if it exists, using the appropriate native file system operation (Step 412). The Undo routine renames CoPath, if it exists, to Path (Step 414).

FileOp - Create Link

Referring to FIG. 11, the create link operation 420 creates a hard link to a file or to another file system object, other than a directory. The hard link is an alternative name and directory entry pointing to the same file, equivalent in all ways to the original name and directory entry. The arguments for this operation are OldPath, an existing path to an object (its original name), and NewPath, a desired new, additional path to the object. The log entry item specific to this operation is NewPath.

The Perform and Advise routines begin by checking whether the operation is permissible and exiting if it is not (Step 422). The operation is impermissible if OldPath does not exist, or if the user does not have "probe" permission for OldPath (i.e., the user cannot read the directory entry), or if NewPath already exists, or if the user does not have permission to create NewPath, or if OldPath and NewPath are in different file systems. Next, the routines create a log entry and append it to the log (Step 424). Next, the Perform routine creates the link (Step 426), while the Advise routine is done (Step 428).

The Finalize routine takes no action (Step 430). The Undo routine deletes NewPath, if it exists (Step 432).

FileOp - Change Attribute(s)

Referring to FIG. 12, the change attribute operation 440 changes one or more attributes of files and directories, named pipes, and other file-system-resident objects (except for soft links). Attributes subject to change include things such as "owner ID", "group ID", and "protection mode". The arguments for this operation are Path, the name of the file or directory to be operated on, AttributeIdentifier, an identifier for the attribute to be changed, and NewAttributeValue, the new value for that attribute. The log entry items specific to this operation are Path, AttributeIdentifier, and OldAttributeValue, the value of the attribute prior to the operation.

The Perform and Advise routines begin by checking whether the operation is permissible and exiting if it is not (Step 442). The operation is impermissible if Path does not exist, or if the user does not have "probe" permission for Path, or if the user does not have permission to change the attribute. Next, the routines get the current attribute value for the file or directory, and store it as OldAttributeValue (Step 444). The routines then create a log entry and append it to the log (Step 446). Next, the Perform routine changes the indicated attribute to NewAttributeValue using the appropriate native file system operation (Step 448), while the Advise routine is done (Step 450).

The Finalize routine takes no action (Step 452). The Undo routine changes the attribute value back to OldAttributeValue, using the appropriate native file system operation (Step 454).

FileOp - Rename File or Directory

Figure 13:
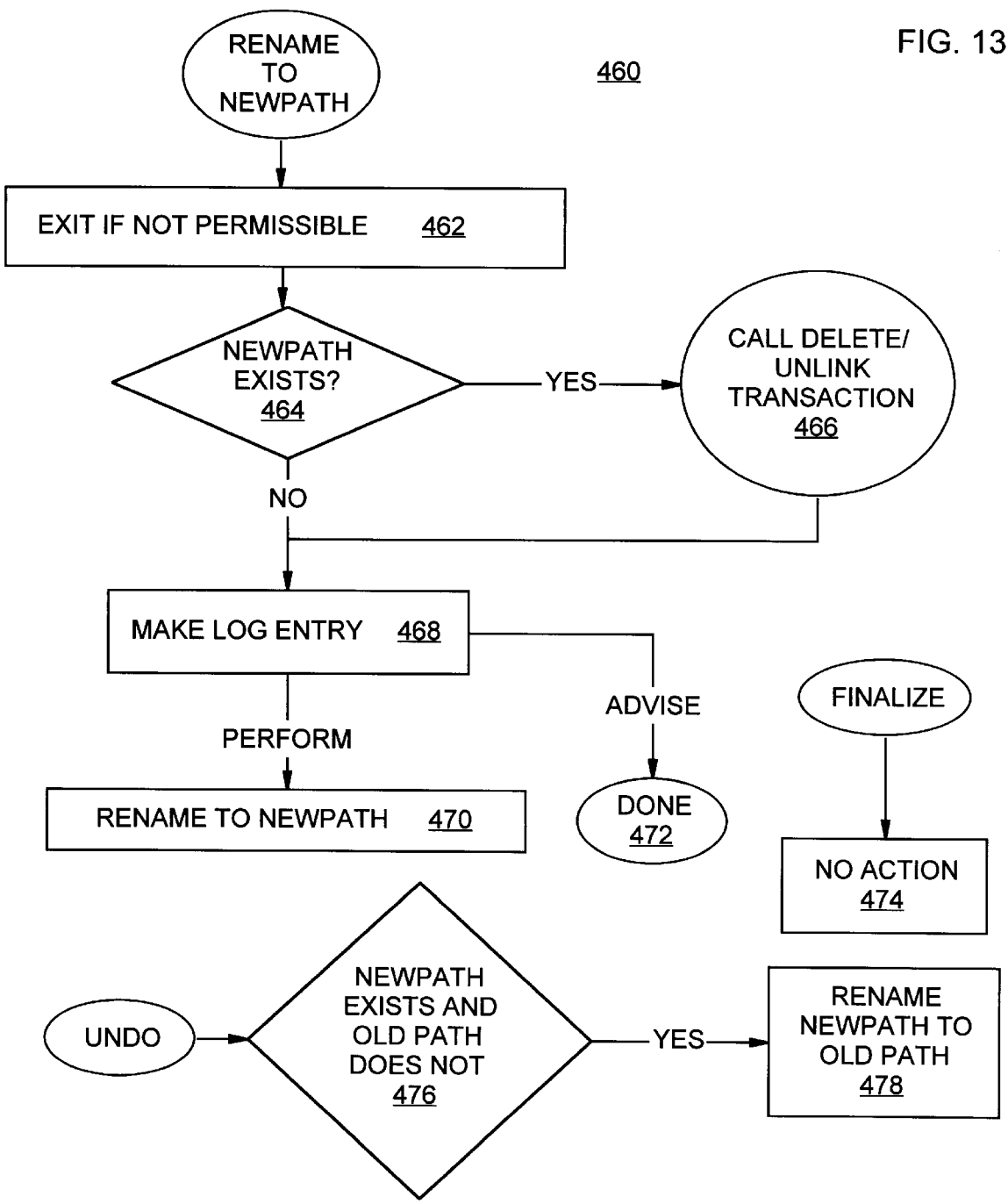
FIG. 13 is a flow diagram of a family of routines in accordance with the present invention for the native file operation of renaming a file system object.

Referring to FIG. 13, the rename operation 460 renames a file or directory. This operation also allows named pipes and other file system-resident objects to be renamed. In UNIX, if a file or directory with the desired new name already exists, it is deleted as part of the UNIX rename operation. To accommodate this, the Perform routine in the preferred embodiment of the present invention checks the legality of any necessary delete operation as well as of the rename operation per se. Then, the Perform routine invokes the appropriate transactional delete operation if an existing file or directory needs to be deleted. The Perform routine then effects the rename operation itself. In the event of a roll back, the rename is first undone, then the delete is undone. The arguments for this operation are OldPath, the path of the file or directory to be rename, and NewPath, the new path for the file or directory. The log entry items specific to this operation are OldPath and NewPath.

The Perform and Advise routines begin by checking whether the operation is permissible and exiting if it is not (Step 462). The operation is impermissible if OldPath does not exist, or if OldPath and NewPath are on different file systems, or if the user does not have permission to perform the rename, or if NewPath is a subdirectory of OldPath, or if OldPath is a directory and NewPath is a file, or if OldPath is a directory and NewPath is a non-empty directory, or if OldPath is a file and NewPath is a directory.

Next, if NewPath exists (Step 464), the routines call the appropriate transactional file operation to unlink Newpath (if it is a file) or delete Newpath, if it is a directory (Step 466). The Perform or Advise version of "delete" or "remove" is used according to whether the Perform or Advise version of "rename" is being invoked.

The routines then create a log entry and append it to the log (Step 468). Next, the Perform routine renames OldPath to NewPath (Step 470), while the Advise routine is done (Step 472).

The Finalize routine takes no action (Step 474). The Undo routine, if NewPath exists and OldPath does not exist (Step 476), renames NewPath to OldPath using the appropriate native file system operation (Step 478).

FileOp - Create Soft Link

Referring to FIG. 14, the create soft link operation 480 creates a soft link, which is an alias for a file or directory or other file system object. A soft link is a file whose contents identify the file or directory for which it is an alias. The arguments for this operation are OldPath, an existing path to an object (its original name), and NewPath, a desired new, additional path to the object. The log entry item specific to this operation is NewPath.

The Perform and Advise routines begin by checking whether the operation is permissible and exiting if it is not (Step 482). The operation is impermissible if OldPath does not exist, or if NewPath already exists, or if the user does not have permission to create NewPath. The routines then create a log entry and append it to the log (Step 484). Next, the Perform routine creates the link (Step 486), while the Advise routine is done (Step 488).

The Finalize routine takes no action (Step 490). The Undo routine deletes NewPath, if it exists (Step 492).

FileOp - Create Named Pipe

Creating a named pipe is substantially the same as creating a directory. A named pipe has the program behavior of a file, but is in fact a temporary communication channel between two programs. It disappears after it has been used, and for that reason it is deleted both for commit and for roll back.

Generation of Copaths

Two basic issues need to be considered with regard to copaths: unique copaths must be generated, and cofiles made by copaths must be located during commit and roll back processing.

A copath refers to (is the name of) a file, directory, or other file-system-resident object in a file system. In a hierarchial file system, it has a parent directory component and a name component. To assure uniqueness of the name component in the embodiment that has been described, the name component may be chosen as follows. Preliminarily, it will be noted that the problem of generating a unique name arises in the context of transactions executed, in the described embodiment, as part of a two-phase commit protocol. In such a protocol, every transaction has a unique transaction identifier and every participant has a unique participant identifier, which is a number signifying the order in which participants joined in the transaction. With these identifiers, a unique name component may be generated by performing the following steps:

Before beginning a transaction or before beginning any transaction, initialize a counter.

When a copath is to be generated, perform the following three steps:

Obtain the current value of the counter.

Concatenate the transaction identifier, the participant identifier, the value of the counter, and an identifying suffix (for example, ".cofile") to be the name component of the copath.

Increment the counter.

Where the transaction identifier is unique to the transaction and no two participants in the transaction have the same identifier, the process just described will generate a unique copath name component.

Two options for generating the parent directory component of a copath will now be described. In one, the parent directory component of the path of the file being operated on is extracted and used. In the other, a working directory is designated that is specific to the given file system. For example, every file system may be extended to have a directory named ".work" such that any application program may create cofiles in that directory.

Under the first option discussed above (the copath is in the same directory as the path being operated on), it is possible that the existence of copaths will interfere with the "Remove a Directory" file operation. For example, suppose file "/foo/bar/bas" is to be deleted, and then directory "/foo/bar" is to be deleted. If the copath for "/foo/bar/baz" is actually in directory "/foo/bar", the second delete operation will fail because the directory "/foo/bar" is not empty. This problem may be avoided by using the second option (i.e., copaths are always in a designated directory which may no be deleted or renamed). Alternatively, the permission check in Step 302 can be modified to allow deletes of directories that contain copaths, and the Finalize routine in Step 314 can be modified to remove any copaths within the directory.

The foregoing strategies do not absolutely guarantee that a copath will be unique. It is possible, although highly unlikely, that a file generated by other software will have the same name. If this happens, the routines may discard the initially-selected copath and try a different one. Eventually, a path will be found that is not otherwise in use. In one embodiment of the present invention, the copath comprises:

Path (the real name of the path argument of the underlying file system operation)

+"," (a comma)

+the transaction identifier (which is date-time stamped)

+a digit (which is incremented until a unique copath is found)

+".cofile".

(Where "+" indicates concatenation.) The routines that search for cofiles, then, look for paths that have a comma followed by the transaction identifier (which the search process will know exactly) followed by any digit followed by ".cofile".

There are situations in which a file operation may cause a cofile to become lost in the sense that its original copath no longer serves to locate it. For example, if one operation creates a cofile with the path "/foo/bar/quux/xxx.cfl" and a second operation renames the directory "/foo/bar" to "/foo/baz", then the copath "/foo/bar/quux/xxx.cfl" no longer refers to the original cofile. The cofile is now "lost", and deleting it during commit processing becomes difficult. It may be noted, however, that lost cofiles are not a problem during roll back processing because the change that caused the cofile to become lost will be rolled back before any operations need to be performed on a cofile.

Lost cofiles are a problem because they clutter up the file system, consuming disk space and polluting directories. A number of different solutions may be adopted to solve this problem. First, cofiles may always be put in a working directory, as noted above, and file operations that would effect the path of the working directory are disallowed. Second, a list of all copaths that have been generated may be maintained, as will be explained below. And third, after certain operations are committed, the target of the operation may be recursively searched for cofiles belonging to the current transaction and then deleted. This will also be explained below.

To maintain a list of all copaths requires that cofile paths be remembered when they are generated and that the record of them be modified whenever a directory is renamed. This may be done as follows. First, an initially empty table (or other data structure) of active copaths is created. When a copath is added to the active copath table, the soft link names (aliases) are removed and replaced with actual names. This may be done by tracing the elements of the path (directory entries) one step at a time, checking each element of the path to see whether it is a soft link and, if so, substituting the destination of the soft link into the copath. For example, if there is a soft link from "/foo/bar" to "/foo/baz" and the copath is generated "/foo/bar/quux/xxx.cfl", then the copath would be altered to read "/foo/baz/quux/xxx.cfl". This process is repeated until no soft links remain in the copath. Then, whenever a file system operation is used to rename a directory, the active copath table will be searched and any occurrences of the old directory name will be replaced with the new directory name. For example, if "/foo/bar" is renamed to "/foo/baz", and the active copath table includes "/foo/bar/quux/xxx.cfl", the entry would be altered to read "/foo/baz/quux/xxx.cfl". Finally, when a cofile is to be deleted, the active copath table is used to find its current path. This may be done, for example, by searching the table for an entry having the same file length component as the cofile to be deleted. The active path will then be used in the delete operation.

The third strategy mentioned above for the problem of lost cofiles is that of searching for them. With this strategy, whenever an attempt to delete a cofile fails, that cofile is added to a list (or other data structure) of lost cofiles. If any cofiles have been lost, Finalize routines for any file operations that might have caused that cofile to become lost will search for the cofile, attempting to delete it. Specifically, when committing a rename operation and either a directory or a soft link is being renamed, the destination (including any subdirectories) will be searched for the cofile. For example, if the copath is "/foo/baz/quux/xxx.cfl" and "/foo/bar" is renamed to "/foo/baz", then when the rename operation is committed, the Finalize routine will search "/foo/baz" and any of its subdirectories for the lost cofile "xxx.cfl". When the lost cofile is found, it will be deleted. Similarly, when committing a remove directory operation, that directory will be searched for lost cofiles.

In some cases, changes to access permissions may prevent a cofile from being removed, for example, if "write" permission is revoked for the cofile's parent directory. If this happens, the Finalize routine can temporarily re-grant itself such permission as is required to delete the cofile.

The present invention thus provides a generalized method for applying the techniques of transaction processing to non-database applications such that manual restoration of file state is substantially reduced or eliminated if a failure occurs. The invention is particularly useful in applying such transaction techniques to file system operations in non-database applications executing on parallel processing systems.

Program Implementation

The invention may be implemented in hardware or software, or a combination of both. However, preferably, the invention is implemented in computer programs executing on programmable computers each comprising a processor, a data storage system (including volatile and non-volatile memory and/or storage elements), at least one input device, and at least one output device. Program code is applied to input data to perform the functions described herein and generate output information. The output information is applied to one or more output devices, in known fashion.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage media or device (e.g., ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

The present invention has been described in terms of specific embodiments. The invention, however, is not limited to these specific embodiments. For example, a particular file system might not support all of the operations described above, or might incorporate some additional operations or features (e.g., the file protection scheme might be different than that of UNIX). However, the techniques described above can be easily adapted to such circumstances. Similarly, a variety of implementations are possible for maintaining the log, such as a relational database, and in different media, such as a disk file or in non-volatile RAM. Accordingly, it is to be understood that the invention is not to be limited by the specific illustrated embodiment, but only by the scope of the appended claims.

What is claimed is:

1. A computer program library residing on a computer-readable medium for adding the semantics of transactions to a set of native operations of a native file system by adding committal and roll back functionality to such native file system, the library comprising a set of one or more families of routines, each such family of routines corresponding to at least one native operation and adapted to be invoked in lieu of the corresponding native operations, each such family of routines including:

(a) a perform routine including computer instructions for causing a computer to provide a functional result which is the functional equivalent of one of the family's corresponding native operations while preserving information necessary to roll back such native operations;

(b) a finalize routine including computer instructions for causing a computer to commit the functional result of a corresponding perform routine; and (c) an undo routine including computer instructions for causing a computer to roll back the functional result of a corresponding perform routine.

2. A computer program library residing on a computer-readable medium for adding the semantics of transactions to a set of native operations of a native file system by adding committal and roll back functionality to such native file system, the library comprising:

(a) a set of one or more families of routines, each family of routines including a perform routine, a finalize routine, and an undo routine, each family of routines corresponding to at least one native operation and adapted to be invoked in lieu of the corresponding native operations; and (b) a transaction master including an opening routine for opening a transaction of native file system operations, a committing routine for committing such a transaction, and a roll back routine for rolling back such a transaction;

where (c) the perform routine of each family includes computer instructions for causing a computer to give the appearance of performing one of the family's corresponding native operations and providing a functional equivalent thereof;

(d) the finalize routine of each family includes computer instructions for causing a computer to commit one of the functional equivalents of one of the family's corresponding native operations;

(e) the undo routine of each family includes computer instructions for causing a computer to roll back one of the functional equivalents of one of the family's corresponding native operations;

(f) the committing routine includes computer instructions for causing a computer to read a transaction log;

(g) the roll back routine includes computer instructions for causing a computer to read the transaction log;

(h) the perform routines of the set of families of routines collectively include computer instructions for causing a computer to append transaction information to the transaction log such as identifying finalize and undo routines;

(i) the committing routine includes computer instructions for causing a computer to invoke finalize routines identified in the transaction log;

(j) the roll back routine includes computer instructions for causing a computer to invoke undo routines identified in the transaction log.

3. The library of claim 2 where the set of families includes a family for the native operation of opening a file for writing.

4. The library of claim 2 where the set of families includes a family for the native operation of opening a file to append to it.

5. The library of claim 2 where the set of families includes a family for the native operation of creating an empty file.

6. The library of claim 2 where the set of families includes a family for the native operation of deleting a file.

7. The library of claim 2 where the set of families includes a family for each of the native operations of deleting a directory, of creating a directory, of renaming a directory, and of renaming a file.

8. The library of claim 2 where the native file system is a UNIX file system and the set of native operations includes substantially all the file system operations available in the UNIX file system application programmers' interface.

9. A method for providing transactional file operations for restoring the state of a set of files in a native computer file system having native modification operations for modifying the state of the files or the file system, the method comprising the steps of:

(a) providing for each of a set of the modification operations a perform routine, a finalize routine, and an undo routine, such that each of these routines then has a corresponding modification operation executable on a computer system, where the perform and finalize routines collectively include computer instructions for causing a computer to effect the corresponding modification operation, and where the finalize and undo routines collectively include computer instructions for causing a computer to effect the roll back of the corresponding modification operation;

(b) providing a transaction master including a transaction open routine for opening a transaction that includes modification operations, a commit routine for committing such a transaction, and a roll back routine for rolling back such a transaction, where the commit routine includes computer instructions for causing a computer to invoke finalize routines, and where the roll back routine includes computer instructions for causing a computer to invoke undo routines;

where (c) the commit routine on invocation commits all open transactions; and (d) the roll back routine on invocation rolls back all open transactions.

10. The method of claim 9 where the native file system is a UNIX file system.

11. The method of claim 9 where the set of modification operations for which routines are provided consists substantially of all native file system operations capable of modifying the state of a file or the file system.

12. The method of claim 9 where the files in the set of files are distributed over two or more host computers.

13. The method of claim 9 further comprising the step of providing a directory delete family of routines for the native modification operation of removing a directory, where:

(a) the perform routine of the directory delete family includes computer instructions for causing a computer to perform the steps of generating a name of a copath and renaming the directory to the name of the copath;

(b) the finalize routine of the directory delete family includes computer instructions for causing a computer to perform the step of deleting the copath name; and (c) the undo routine of the directory delete family includes computer instructions for causing a computer to perform the step of renaming the copath name to the original directory name.

14. The method of claim 9 further comprising the step of providing an update family of routines for the native modification operation of opening a file for updating, where:

(a) the perform routine of the update family includes computer instructions for causing a computer to perform the steps of generating a name of a copath and copying the file to the copath as a cofile;

(b) the finalize routine of the update family includes computer instructions for causing a computer to perform the step of deleting the copath; and (c) the undo routine of the update family includes computer instructions for causing a computer to perform the steps of copying the cofile over the original file and then deleting the copath.

* * * * *